United States Patent
Leroux et al.

(10) Patent No.: US 10,499,351 B2
(45) Date of Patent: Dec. 3, 2019

(54) CONTROLLER DIRECTIVES TO ENABLE MULTIPOINT RECEPTION VIA MCS AND POWER CONSTRAINTS MASKS

(71) Applicant: Huawei Technologies Co., Ltd., Shenzhen (CN)

(72) Inventors: Philippe Leroux, Ottawa (CA); Aaron Callard, Ottawa (CA); Nimal Gamini Senarath, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/660,682

(22) Filed: Mar. 17, 2015

(65) Prior Publication Data

US 2016/0278027 A1    Sep. 22, 2016

(51) Int. Cl.
*H04W 52/38* (2009.01)
*H04L 1/00* (2006.01)
(Continued)

(52) U.S. Cl.
CPC ........ *H04W 52/386* (2013.01); *H04J 11/004* (2013.01); *H04L 1/0003* (2013.01);
(Continued)

(58) Field of Classification Search
USPC ........................................................ 370/329
See application file for complete search history.

(56) References Cited

U.S. PATENT DOCUMENTS 9,775,117 B1 *    9/2017    Jafarian ............... H04W 52/248
2008/0207245 A1    8/2008    Wakabayashi et al.
(Continued)

FOREIGN PATENT DOCUMENTS

CN    101258766 A    9/2009
CN    102484551 A    5/2012
(Continued)

OTHER PUBLICATIONS

Hamza, A.S. et al., "A Survey on Inter-Cell Interference Coordination Techniques in OFDMA-based Cellular Networks," Mar. 19, 2013, 40 pages.
(Continued)

*Primary Examiner* — Gregory B Sefcheck
*Assistant Examiner* — Majid Esmaeilian
(74) *Attorney, Agent, or Firm* — Slater Matsil, LLP (57) ABSTRACT

A controller having access to channel information associated with a neighboring access point (AP) may communicate a mask to a served user equipment (UE). The mask may specify transmission parameters for an uplink transmission between the served UE and a serving AP such that a successful decoding probability of the uplink transmission at the neighboring AP exceeds a threshold. The mask may specify a maximum MCS level for the uplink transmission, a minimum transmit power level for the uplink transmission, and/or a precoder constraint for the uplink transmission that produces constructive interference at a spatial location of the neighboring AP. This may enable the neighboring AP to isolate the uplink transmission from uplink wireless signals using an interference cancellation technique, e.g., successive interference cancellation (SIC) techniques.

34 Claims, 4 Drawing Sheets

(51) Int. Cl.
- *H04W 72/12* (2009.01)
- *H04W 52/24* (2009.01)
- *H04J 11/00* (2006.01)
- *H04W 52/14* (2009.01)
- *H04W 52/36* (2009.01)

(52) U.S. Cl.
CPC ..... *H04W 52/243* (2013.01); *H04W 72/1236* (2013.01); *H04L 1/0009* (2013.01); *H04W 52/146* (2013.01); *H04W 52/367* (2013.01)

(56) References Cited

U.S. PATENT DOCUMENTS

| | | |
|---|---|---|
| 2010/0166048 A1 | 7/2010 | Young et al. |
| 2010/0216472 A1* | 8/2010 | Youn .............. H04L 1/0003 455/436 |
| 2010/0226340 A1* | 9/2010 | Tayloe .............. H04W 36/30 370/332 |
| 2011/0103287 A1 | 5/2011 | Ma et al. |
| 2011/0195731 A1* | 8/2011 | Jang .............. H04W 52/243 455/501 |
| 2011/0237272 A1 | 9/2011 | Gorokhov et al. |
| 2011/0317639 A1* | 12/2011 | Lee .............. H04L 1/0015 370/329 |
| 2012/0002611 A1 | 1/2012 | You et al. |
| 2012/0093093 A1 | 4/2012 | Frenger et al. |
| 2012/0135778 A1* | 5/2012 | Tian .............. H04L 1/0003 455/522 |
| 2012/0202512 A1* | 8/2012 | Braithwaite ....... H04W 52/267 455/452.2 |
| 2012/0210786 A1 | 8/2012 | Steinbrink et al. |
| 2012/0252423 A1 | 10/2012 | Brisebois et al. |
| 2012/0289170 A1 | 11/2012 | Li et al. |
| 2013/0083730 A1 | 4/2013 | Gaal et al. |
| 2013/0142098 A1* | 6/2013 | Kwon .............. H04W 52/04 370/311 |
| 2013/0235838 A1 | 9/2013 | Kim et al. |
| 2013/0242844 A1 | 9/2013 | Singh et al. |
| 2013/0279478 A1 | 10/2013 | De Bruin et al. |
| 2014/0204857 A1* | 7/2014 | Mallik .............. H04L 1/0009 370/329 |
| 2015/0003404 A1* | 1/2015 | Gokturk .............. H04W 16/10 370/330 |
| 2015/0078186 A1* | 3/2015 | Lagen Morancho .. H04B 7/024 370/252 |
| 2015/0117309 A1* | 4/2015 | Gage .............. H04W 8/005 370/328 |
| 2016/0021565 A1 | 1/2016 | Kim et al. |
| 2016/0174095 A1* | 6/2016 | Damnjanovic ....... H04W 36/30 370/252 |

FOREIGN PATENT DOCUMENTS

| | | |
|---|---|---|
| CN | 102687444 A | 9/2012 |
| CN | 102695261 A | 9/2012 |
| CN | 104041146 A | 9/2014 |
| WO | 2014157786 A1 | 10/2014 |

OTHER PUBLICATIONS

Saxena, P. et al., "Interference-Free Regions with Han-Kobayashi Scheme for M-QAM and Scalar Channels," 2012 IEEE 8th International Conference on Wireless and Mobile Computing, Networking and Communications (WiMob), Oct. 8-10, 2012, 8 pages.

Abu-Ali et al.,"Uplink Scheduling in LTE and LTE-Advanced: Tutorial, Survey and Evaluation Framework", IEEE Communications Surveys and Tutorials, vol. 16, No. 3, Third Quarter 2014, 27 pages.

Boujelben et al., "A Comparative Study of Interference Coordination Schemes for Wireless Mobile Advanced Systems", The 2014 International Symposium on Networks, Computers and Communications, IEEE, Jun. 17, 2014, 5 pages.

Dotsch et al., "Quantitative Analysis of Split Base Station Processing and Determination of Advantageous Architectures for LTE", 2013, 24 pages.

3GPP TSG RAN WG1 #72bis, R1-131093, "Comparison of interference mitigation schemes for TDD traffic adaptation," Texas Instruments, Apr. 15-19, 2013, 3 pages.

Venkatasubramanian, Venkatkumar, et al., "On the Performance Gain of Flexible UL/DL TDD with Centralized and Decentralized Resource Allocation in Dense 5G Deployments," 2014, IEEE 25th International Symposium on Personal, Indoor and Mobile Radio Communications, pp. 1840-1845.

Alcatel-Lucent, "Coping with the multi-cell timing issues in uplink COMP joint processing," 3GPP TSG-RAN WG1 Meeting #58 R1-09-3018, Shenzhen, China; Aug. 24, 2009, 6 pages.

* cited by examiner

CONTROLLER DIRECTIVES TO ENABLE MULTIPOINT RECEPTION VIA MCS AND POWER CONSTRAINTS MASKS

TECHNICAL FIELD

The present invention relates to the field of wireless communications, and, in particular embodiments, to a system and method for controller directives to enable multipoint reception via MCS and power constraints masks.

BACKGROUND

Next-generation wireless networks may include densely deployed access points in an attempt to increase spectral efficiency. One challenge in densely deployed wireless networks is to assign transmission parameters to user equipments (UEs) that provide acceptable uplink transmission performance, while mitigating interference with neighboring access points. One uplink scheduling strategy that is useful for densely deployed networks is to coordinate joint processing and scheduling between access points (APs).

SUMMARY OF THE INVENTION

Technical advantages are generally achieved by embodiments of this disclosure which describe controller directives to enable multipoint reception via modulation and coding schemes (MCSs) and power constraints masks.

In accordance with an embodiment, a method for scheduling uplink transmissions is provided. In this example, the method includes identifying a served user equipment (UE) assigned to a serving AP. A first controller is associated with the serving AP and a second controller has access to channel information associated with a neighboring AP. The method further includes communicating, by the second controller, masking information to the first controller or the served UE. The masking information specifies at least one transmission parameter for the served UE. The at least one transmission parameter specified by the masking information is configured to produce an uplink transmission having a successful decoding probability at the neighboring AP that exceeds a threshold. An apparatus for performing this method is also provided.

In accordance with another embodiment, a method for scheduling uplink transmissions is provided. In this example, the method includes receiving masking information from a second controller having access to channel information associated with a neighboring AP. The masking information specifies at least one transmission parameter for uplink transmissions from a served UE to a serving AP. The at least one transmission parameter specified by the masking information is adapted to produce an uplink transmission having a successful decoding probability at the neighboring AP that exceeds a threshold. The method further includes scheduling an uplink transmission of the served UE in accordance with the masking information when one or more criteria are satisfied. An apparatus for performing this method is also provided.

In accordance with yet another embodiment, a method for performing uplink transmissions is provided. In this example, the method includes receiving masking information from a controller associated with a neighboring access point (AP). The masking information specifies at least one transmission parameter for the served UE. The at least one transmission parameter specified by the masking information is adapted to produce an uplink transmission having a successful decoding probability at the neighboring AP that exceeds a threshold. The method further includes performing the uplink transmission in accordance with the transmission parameters specified by masking information when one or more criteria are satisfied. An apparatus for performing this method is also provided.

In accordance with yet another embodiment, a method for scheduling uplink transmissions is provided. In this example, the method includes identifying a served user equipment (UE) assigned to a serving AP. A first controller is associated with the serving AP and a second controller has access to channel information associated with a neighboring AP. Transmissions from the served UE to the serving AP interfere with, or are projected to interfere with, wireless signals communicated by the neighboring AP. The method further includes communicating, by the second controller, masking information to the first controller or the served UE. The masking information specifies channel information corresponding to an air interface between the served UE and the neighboring AP, and an instruction to select transmission parameters for the served UE that produce an uplink transmission that either has a successful decoding probability at the neighboring AP that exceeds a first threshold or a received signal power of the at the neighboring AP that exceeds a second threshold.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Traditional joint scheduling/reception schemes typically require relatively fast network connections between participating access points (APs) to exchange the high volume control signaling needed to coordinate execution of the joint scheduling/reception schemes. Unfortunately, high-speed network connections may not always be available in next generation densely deployed wireless network environments. Accordingly, alternative techniques for achieving joint scheduling that do not rely on exchanging channel information between APs/distributed-schedulers are desired.

Aspects of this disclosure achieve joint scheduling by communicating masking information, or a mask (for short), from a controller associated with a neighboring AP to either a served user equipment (UE) or a controller associated with a serving AP. The mask specifies uplink transmission parameters for the served UE that are configured to produce an uplink transmission having a successful decoding probability at the neighboring AP that exceeds a threshold. In one embodiment, the masking information specifies a maximum MCS level for the uplink transmission of the served UE. In another embodiment, the masking information specifies a minimum transmit power level for the uplink transmission of the served UE such that a received signal power of the uplink transmission at the neighboring AP exceeds a threshold. In yet another embodiment, the masking information specifies a precoder constraint for the uplink transmission of the served UE. In such an embodiment, the precoder constraint is configured to produce constructive interference at a spatial location of the neighboring AP such that a received signal power of the uplink transmission at the neighboring AP exceeds a threshold. In yet other embodiments, the masking information includes a reverse mask specifying a maximum MCS level and a minimum transmit power level for the uplink transmission of the served UE. In such embodiments, the neighboring AP is adapted to isolate the uplink transmission from received wireless signals in accordance with an interference cancellation technique, e.g., successive interference cancellation (SIC) techniques. In another embodiment, the serving AP and the neighboring AP receive data carried by the uplink transmission in accordance with a multipoint reception scheme. These and other aspects are described in greater detail below.

Figure 1:
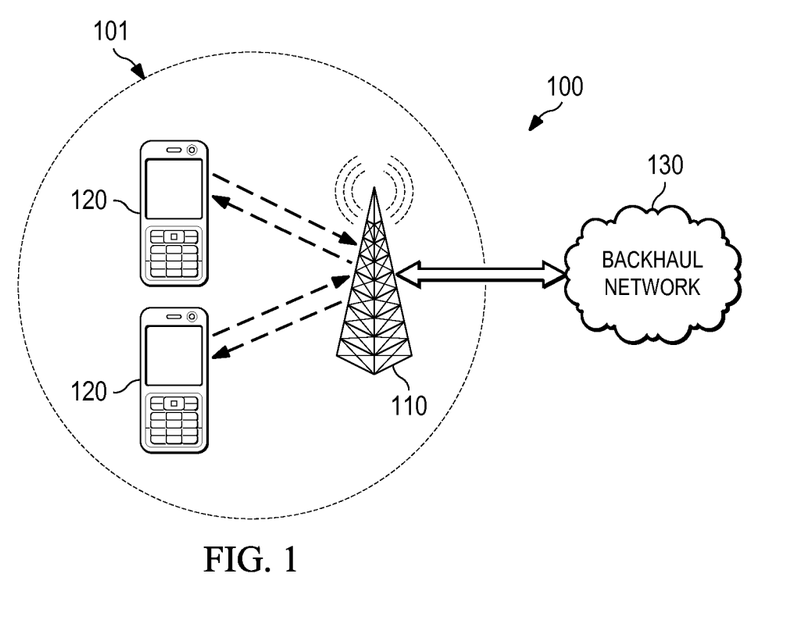
FIG. 1 illustrates a diagram of an embodiment wireless network.

FIG. 1 illustrates a network 100 for communicating data. The network 100 includes an access point (AP) 110 having a coverage area 101, a plurality of mobile devices 120, and a backhaul network 130. The AP 110 may include any component capable of providing wireless access by, inter alia, establishing uplink and/or downlink connections with the mobile devices 120, such as a base station, an evolved node B (eNB), a femtocell, and other wirelessly enabled devices. The mobile devices 120 may include any component capable of establishing a wireless connection with the AP 110, such as user equipment (UE), a mobile station (STA), or other wirelessly enabled devices. The backhaul network 130 may be any component or collection of components that allow data to be exchanged between the AP 110 and a remote end (not shown). In some embodiments, the network 100 includes various other wireless devices, such as relays, and low power nodes.

Figure 2:
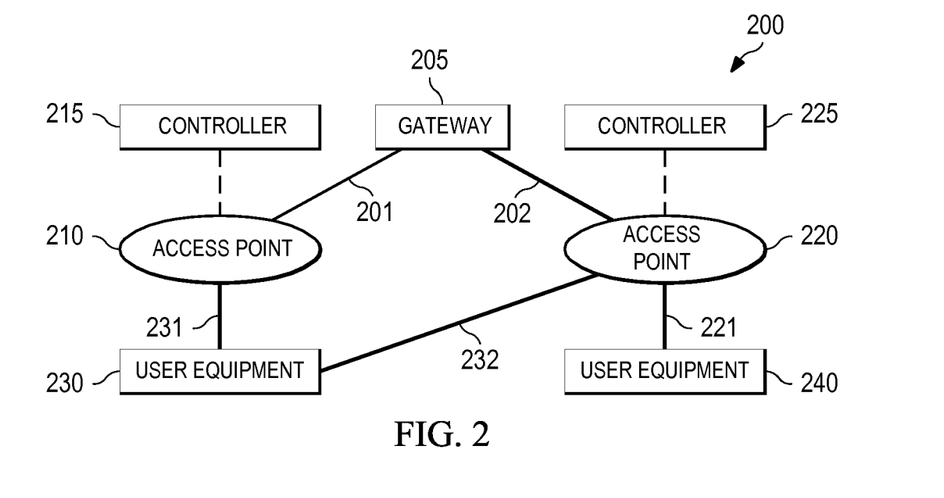
FIG. 2 illustrates a diagram of an embodiment network architecture for re-assigning scheduling responsibilities.

Aspects of this disclosure use masking information to schedule an uplink transmission. FIG. 2 illustrates an embodiment network architecture 200 for using masking information to schedule an uplink transmission. As shown, the network architecture 200 includes a gateway 205, controllers 215, 225, access points (APs) 210, 220, and UEs 230, 240. The gateway 205 communicates with the APs 210, 220 through backhaul network connections 201, 202, respectively. In this example, the UE 230 is served by the AP 210, and consequently the UE 230 and the AP 210 are referred to as the served UE 230 and the serving AP 210, respectively. For similar reasons, the AP 220 is referred to as the neighboring AP 220. For purposes of this disclosure, a neighboring AP may be any AP sufficiently near a serving AP to receive a transmission from a served UE. Hence, it is not necessary that the neighboring AP is the nearest neighboring AP of a serving AP.

The served UE 230 may perform uplink transmissions to the serving AP 210 over a radio interface 231. Those uplink transmissions may also propagate over a radio interface 232, and ultimately produce interference at the neighboring AP 220. In one example, uplink transmissions by the served UE 230 interfere with uplink transmissions communicated from the UE 240 to the neighboring AP 220 over a radio interface 221.

The controller 215 may be associated with the serving AP 210, such that the controller 215 generally performs uplink scheduling for the serving AP 210. Likewise, the controller 225 may be associated with (or have access to channel information provided by) the neighboring AP 220. The controller 225 may generally performs uplink scheduling for the neighboring AP 220. The controllers 215, 225 may be deployed on the same device platform as the respective APs 210, 220, or on different device platforms.

Depending on transmission parameters (e.g., MCS level, transmit power level, precoder) used by the served UE 230, the uplink transmission signals propagating over the radio interface 232 may, or may not, be decodable by the neighboring AP 220. When the uplink transmission signals propagating over the radio interface 232 are not decodable, they may interfere with other wireless signals being received by the neighboring AP 220. When uplink transmission signals propagating over the radio interface 232 are decodable at the neighboring AP 220, the neighboring AP 220 can either isolate those uplink transmission signals from other wireless signals being received by the neighboring AP 220 or participate in multipoint reception.

In some embodiments, the controller 225 communicates masking information to the controller 215 or the served UE 230. The masking information specifies uplink transmission parameters for an uplink transmission of the served UE 230 that increase the likelihood that the neighboring AP 220 will be able to decode the uplink transmission. In one embodiment, the masking information specifies an MCS level for the uplink transmission of the served UE 230. In another embodiment, the masking information specifies a minimum transmit power level for the uplink transmission of the served UE 230 such that a received signal power of the uplink transmission at the neighboring AP 220 exceeds a threshold. In yet another embodiment, the masking information specifies a precoder constraint for the uplink transmission of the served UE 230. The precoder constraint may be configured to produce constructive interference at a spatial location of the neighboring AP 220 such that a received signal power of the uplink transmission at the neighboring AP 220 exceeds a threshold. In yet other embodiment, the masking information includes a reverse mask specifying an MCS level and a minimum transmit power level for the uplink transmission of the served UE 230.

As discussed above, the uplink transmission signals propagating over the radio interface 232 may or may not be decodable at the neighboring AP 220 based on the uplink transmission parameters assigned to the served UE 230. Accordingly, the controller 225 may select transmission parameters that allow the neighboring AP 220 to receive and decode the uplink transmission signals from the served UE 230. The selected transmission parameters may be communicated to the controller 225 or the served UE 230. Notably, the controller 225 may be better able to determine appropriate transmission parameters for allowing the neighboring AP 220 to decode the uplink transmission signals from the served UE 230 than the controller 215 by virtue of the controller 225 having access to channel state information (CSI) generated by the neighboring AP 220.

The controller 225 may take various steps to increase the probability that the uplink transmission signals propagating over the radio interface 232 will be correctly decoded at the neighboring AP 220. In one example, the controller 225 reduces an MCS level and/or increases a transmit power level assigned to the served UE 230 to compensate for the radio interface 232 having a higher path loss than the radio interface 231. In another example, the controller 225 assigns an uplink precoder to the served UE 230 to create constructive interference at the spatial location of the neighboring AP 220. The neighboring AP 220 may isolate the decoded uplink transmission of the served UE 230 from other wireless transmissions received by the neighboring AP 220 using an interference cancellation technique. Alternatively, the neighboring AP 220 and the serving AP 210 may receive uplink transmission of the served UE 230 in accordance with a multipoint reception scheme. For example, upon successfully decoding the uplink transmission, the serving AP 210 and the neighboring AP 220 may forward decoded signals to the gateway 205 over the backhaul network connections 201, 202 (respectively), which may combine the decoded signals prior to forwarding the combined signal to a destination, e.g., remote end. This may be beneficial when an available bandwidth over the backhaul network connection 201 is constrained, e.g., when a data transmission rate over the radio interface 231 exceeds an available bandwidth over the backhaul network connection 201.

Figure 3:
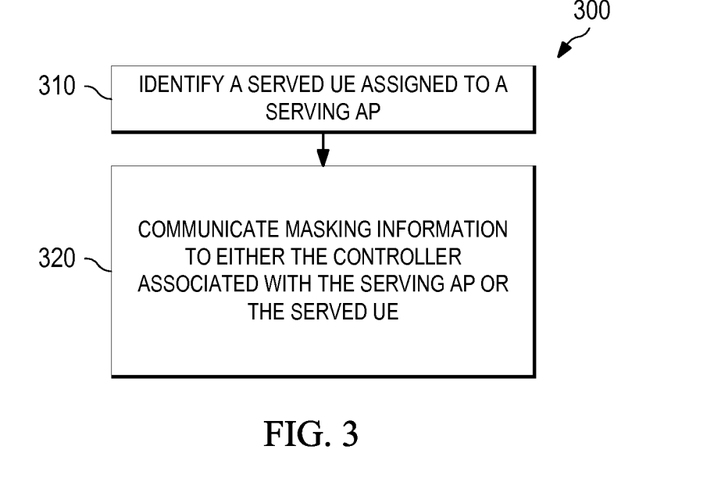
FIG. 3 illustrates a flow chart of an embodiment method for communicating masking information.

FIG. 3 illustrates a flowchart of an embodiment method 300 for communicating masking information, as may be performed by a controller with access to channel information associated with a neighboring AP. As used herein, a controller associated with a neighboring AP refers to a controller having channel information associated with (e.g., produced by) the neighboring AP. At step 310, the controller identifies a served user equipment (UE) assigned to a serving AP. In the context of this disclosure, the controller identifies the served UE by identifying any parameter/information related to the served UE. For example, the controller may identify the served UE upon identifying any information (e.g., interference information) associated with the served UE in channel information provided by the neighboring AP. Another controller is associated with the serving AP, and uplink transmissions from the served UE to the serving AP are projected to interfere with wireless signals communicated by the neighboring AP. At step 320, the controller communicates masking information to either the controller associated with the serving AP or the served UE. The transmission parameters specified by the masking information are configured to produce an uplink transmission having a successful decoding probability at the neighboring AP that exceeds a threshold. The controller associated with the serving AP and/or the served UE may use transmission parameters specified by the masking information to schedule/perform an uplink transmission to the serving AP when one or more criteria are satisfied. In such cases, the neighboring AP may be adapted to isolate the uplink transmission from received wireless signals in accordance with an interference cancellation technique. Alternatively, the serving AP and the neighboring AP may be adapted to receive data carried by the uplink transmission in accordance with a multipoint reception scheme.

Various criteria may prompt the serving AP and/or the served UE to use transmission parameters specified by the masking information. In one embodiment, the one or more criteria are satisfied when an available backhaul link capacity of the serving AP is below a threshold, e.g., the backhaul link is saturated. In another embodiment, the one or more criteria are satisfied when the serving UE is required to use a high transmit power to effectively communicate with the serving AP, e.g., poor link quality between serving AP and serving UE. In another embodiment, the one or more criteria are satisfied when the serving UE needs to transmit data having a quality of service (QoS) parameter that is not satisfied by the link between the serving AP and serving UE, e.g., low-latency requirement, high-reliability requirement. In some embodiments, the masking information may provide alternative transmission parameters. For example, the masking information may indicate that the UE either use an MCS that is below a threshold (e.g., to increase likelihood of successful decoding at neighboring AP) or that the transmit power be below a threshold (e.g., to reduce the interference at neighboring AP if uplink signal cannot be decoded). In other embodiments, the masking information may provide channel information to a neighboring AP and an instruction to select transmission parameters that will either allow decoding or prevent interference to be generated at the neighboring AP.)

Figure 4:
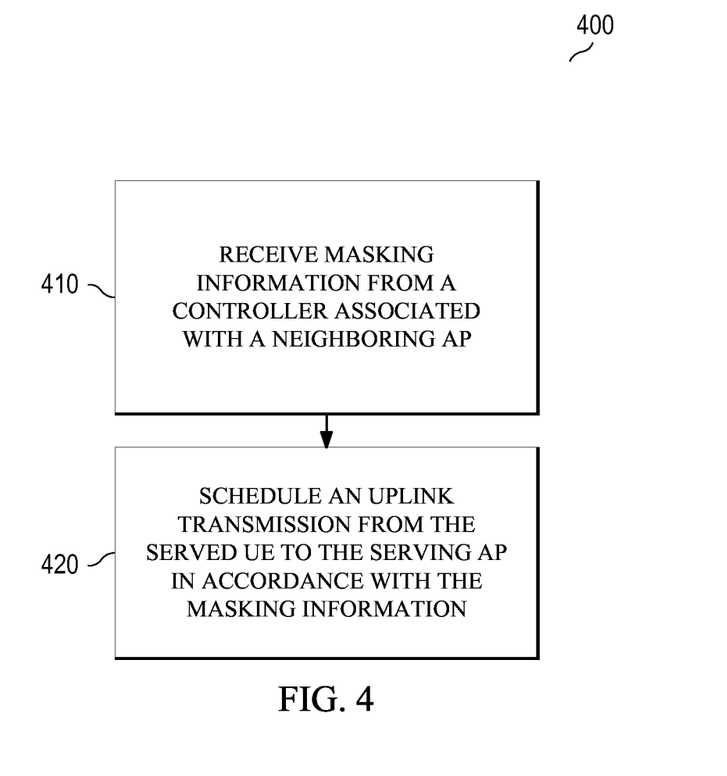
FIG. 4 illustrates a flow chart of an embodiment method for scheduling an uplink transmission.

FIG. 4 illustrates a flow chart of an embodiment method 400 for scheduling an uplink transmission based on masking information, as may be performed by a controller associated with a serving AP. At step 410, the controller associated with the serving AP receives masking information from a controller associated with the neighboring AP. At step 420, the controller associated with the serving AP schedules an uplink transmission of the served UE in accordance with transmission parameters specified by, or derived from, the masking information. These steps are generally carried out in sequence, however, under certain circumstances, there may be parallel aspects among the steps.

Figure 5:
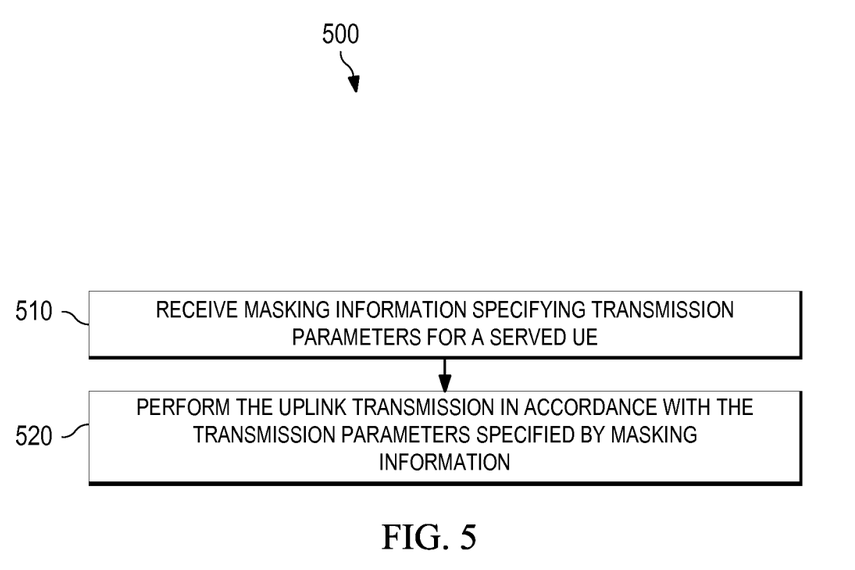
FIG. 5 illustrates a flow chart of an embodiment method for performing an uplink transmission.

FIG. 5 illustrates a flow chart of an embodiment method 500 for performing an uplink transmission based on masking information, as may be performed by a served UE. At step 510, the served UE receives masking information specifying transmission parameters from a controller associated with a neighboring AP. The transmission parameters specified by the masking information may be configured to produce an uplink transmission having a successful decoding probability at the neighboring AP that exceeds a threshold. At step 520, the served UE performs the uplink transmission in accordance with the transmission parameters specified by the masking information when the one or more criteria are satisfied. These steps are generally carried out in sequence, however, under certain circumstances, there may be parallel aspects among the steps.

Figure 6:
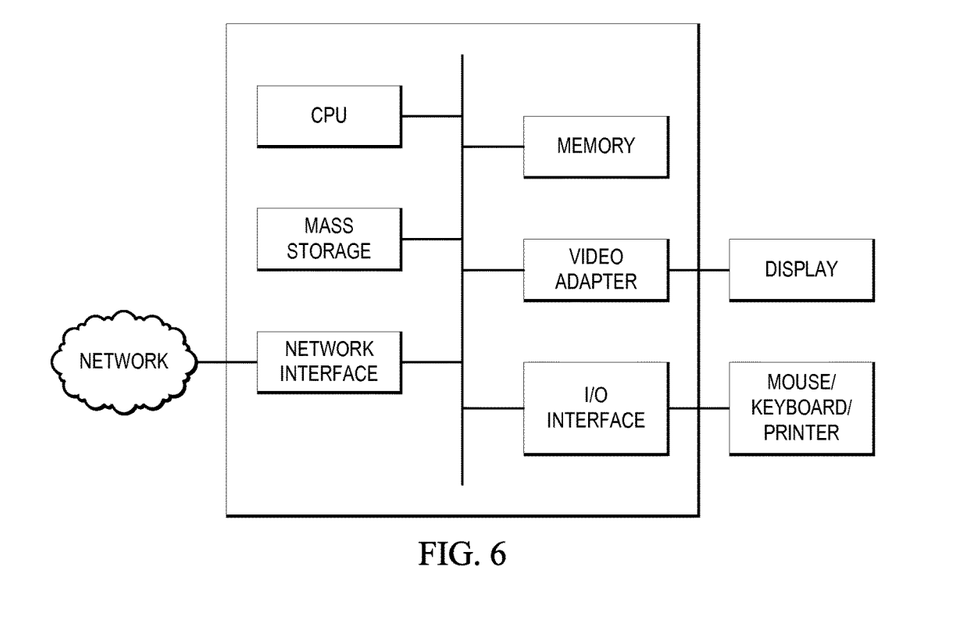
FIG. 6 illustrates a diagram of an embodiment computing platform.

FIG. 6 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers. The processing system may include a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may include any type of electronic data processor. The memory may include any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may include any type of non-transitory storage device configured to store data, programs, and other information and to make the data, programs, and other information accessible via the bus. The mass storage device may include, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may include wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 7:
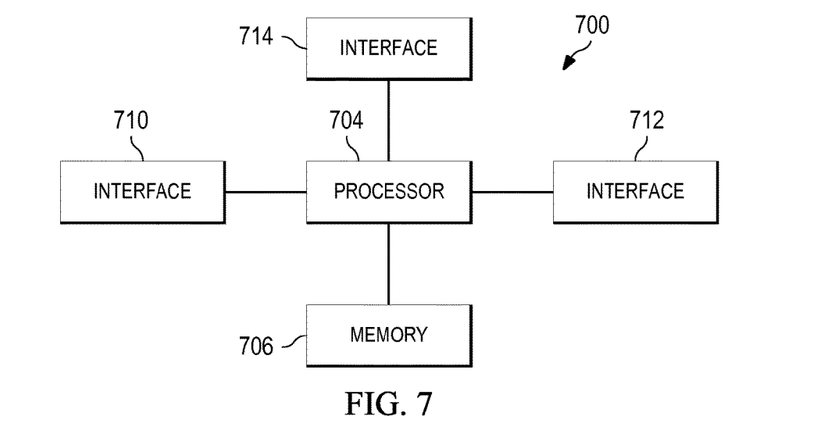
FIG. 7 illustrates a diagram of an embodiment communications device.

FIG. 7 illustrates a block diagram of an embodiment of a communications device 700, which may be equivalent to one or more devices (e.g., requesting devices, candidate devices, network nodes) discussed above. The communications device 700 may include a processor 704, a memory 706, and a plurality of interfaces 710, 712, 714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710, 712, 714 may be any component or collection of components that allow the communications device 700 to communicate with other devices.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method for scheduling uplink transmissions, the method comprising:

determining, by a first controller associated with a neighboring access point (AP), a maximum modulation coding scheme (MCS) level and a minimum transmit power level based on channel state information (CSI) generated by the neighboring AP; and communicating, by the first controller, a reverse mask towards a second controller associated with a serving AP or a served user equipment (UE) served by the serving AP, the reverse mask specifying both the MCS level and the minimum transmit power level for an uplink transmission from the served UE, the maximum MCS level and the minimum transmit power level configured such that the uplink transmission from the served UE to the serving AP has a successful decoding probability at the neighboring AP that exceeds a threshold, the neighboring AP being a neighbor of the serving AP.

2. The method of claim 1, wherein uplink transmission signals from the served UE to the serving AP interfere with, or are projected to interfere with, wireless signals communicated to the neighboring AP.

3. The method of claim 1, wherein the minimum transmit power level specified by the reverse mask is adapted to produce a received signal power of the uplink transmission at the neighboring AP that exceeds a threshold.

4. The method of claim 1, wherein the reverse mask further specifies a precoder constraint for the uplink transmission of the served UE that is configured to produce constructive interference at a spatial location of the neighboring AP such that a received signal power of the uplink transmission at the neighboring AP exceeds a threshold.

5. The method of claim 1, wherein the reverse mask specifies uplink transmission parameters.

6. The method of claim 1, wherein the first controller is a central controller.

7. The method of claim 1, wherein the first controller is a distributed controller co-located with the neighboring AP.

8. The method of claim 1, wherein the neighboring AP is an AP having an available backhaul link capacity.

9. The method of claim 1, wherein an amount of backhaul resources required by the served UE exceeds an available backhaul capacity of the serving AP.

10. The method of claim 1, wherein the reverse mask is communicated to the served UE or the serving AP when the uplink transmission from the served UE has a data transmission rate over a radio interface between the served UE and the serving AP that exceeds an available bandwidth over a backhaul network connection between the serving AP and a backhaul network.

11. The method of claim 1, further comprising communicating to the neighboring AP an instruction to select transmission parameters that will allow decoding of the uplink transmission or prevent interference to be generated at the neighboring AP.

12. A first controller comprising:

a processor; and a non-transitory computer readable storage medium storing programming for execution by the processor, the programming including instructions to:

determine a maximum modulation coding scheme (MCS) level and a minimum transmit power level based on channel state information (CSI) generated by a neighboring access point (AP), wherein the first controller associated is associated with the neighboring AP; and communicate a reverse mask towards a second controller associated with a serving AP or a served user equipment (UE) served by the serving AP, the reverse mask specifying both the MCS level and the minimum transmit power level for an uplink transmission from the served UE, the maximum MCS level and the minimum transmit power level configured such that the uplink transmission from the served UE to the serving AP has a successful decoding probability at the neighboring AP that exceeds a threshold.

13. The first controller of claim 12, wherein uplink transmission signals from the served UE to the serving AP interfere with, or are projected to interfere with, wireless signals communicated to the neighboring AP.

14. The first controller of claim 12, wherein the minimum transmit power level specified by the reverse mask is adapted to produce a received signal power of the uplink transmission at the neighboring AP exceeds a threshold.

15. The first controller of claim 12, wherein the reverse mask further specifies a precoder constraint for the uplink transmission of the served UE that is configured to produce constructive interference at a spatial location of the neighboring AP such that a received signal power of the uplink transmission at the neighboring AP exceeds a threshold.

16. The first controller of claim 12, wherein the uplink transmission of the served UE is performed in accordance with the reverse mask.

17. The first controller of claim 12, wherein the neighboring AP is an AP having an available backhaul link capacity.

18. A method for scheduling uplink transmissions, the method comprising:
receiving, by a second controller associated with a serving access point (AP), a reverse mask from a first controller associated with a neighboring AP, the reverse mask specifying both a maximum modulation coding scheme (MCS) level and a minimum transmit power level for an uplink transmission from a served user equipment (UE), the maximum MCS level and the minimum transmit power level configured such that the uplink transmission from the served UE to the serving AP has a successful decoding probability at the neighboring AP that exceeds a threshold, the maximum MCS level and the minimum transmit power level determined by the first controller based on channel state information (CSI) generated by the neighboring AP; and
scheduling, by the second controller, the uplink transmission of the served UE to the serving AP in accordance with the maximum MCS level and the minimum transmit power level specified in the reverse mask when one or more criteria are satisfied.

19. The method of claim 18, wherein uplink transmission signals from the served UE to the serving AP interfere with, or are projected to interfere with, wireless signals communicated by the neighboring AP.

20. The method of claim 18, wherein the reverse mask further specifies a precoder constraint for the uplink transmission that is configured to produce constructive interference at a spatial location of the neighboring AP such that a received signal power of the uplink transmission at the neighboring AP exceeds a threshold, and wherein the scheduling comprises scheduling, by the second controller, the uplink transmission of the served UE to the serving AP in accordance with the maximum MCS level, the minimum transmit power level specified, and the precoder constraint specified in the reverse mask when the one or more criteria are satisfied.

21. The method of claim 18, wherein the neighboring AP is an AP having an available backhaul link capacity.

22. A second controller associated with a serving access point (AP), the second controller comprising:
a processor; and
a non-transitory computer readable storage medium storing programming for execution by the processor, the programming including instructions to:
receive a reverse mask sent by a first controller associated with a neighboring access point (AP), the reverse mask specifying both a maximum modulation coding scheme (MCS) level and a minimum transmit power level for an uplink transmissions from a served user equipment (UE), the maximum MCS level and the minimum transmit power level configured such that the uplink transmission from the served UE to a serving AP has a successful decoding probability at the neighboring AP that exceeds a threshold, the maximum MCS level and the minimum transmit power level determined by the first controller associated with the neighboring AP based on channel state information (CSI) generated by the neighboring access point (AP); and
scheduling the uplink transmission from the served UE to the serving AP in accordance with the reverse mask when one or more criteria are satisfied.

23. A method for performing uplink transmissions, the method comprising:
receiving, by a served user equipment (UE), a reverse mask sent by a first controller associated with a neighboring access point (AP), the reverse mask specifying both a maximum modulation coding scheme (MCS) level and a minimum transmit power level for an uplink transmission from the served UE, the maximum MCS level and the minimum transmit power level configured such that the uplink transmission from the served UE to a serving AP has a successful decoding probability at the neighboring AP that exceeds a threshold, the maximum MCS level and the minimum transmit power level determined by the first controller based on channel state information (CSI) generated by the neighboring AP, wherein the first controller is different from the neighboring AP; and
performing, by the served UE, the uplink transmission to the serving AP in accordance with the maximum MCS level and the minimum transmit power level specified in the reverse mask when one or more criteria are satisfied.

24. The method of claim 23, wherein the reverse mask further specifies a precoder constraint for the uplink transmission of the served UE, and wherein the performing comprises performing, by the served UE, the uplink transmission to the serving AP in accordance with the maximum MCS level, the minimum transmit power level and the precoder constraint specified in the reverse mask when the one or more criteria are satisfied.

25. The method of claim 23, wherein uplink transmission signals from the served UE to the serving AP interfere with, or are projected to interfere with, wireless signals communicated to the neighboring AP.

26. The method of claim 23, wherein the minimum transmit power level specified by the reverse mask is adapted to produce a received signal power of the uplink transmission at the neighboring AP exceeds a threshold.

27. The method of claim 23, wherein the reverse mask further specifies a precoder constraint for the uplink transmission of the served UE that is configured to produce constructive interference at a spatial location of the neighboring AP such that a received signal power of the uplink transmission at the neighboring AP exceeds a threshold, and wherein performing comprises performing, by the served UE, the uplink transmission to the serving AP in accordance with the maximum MCS level, the minimum transmit power level and the precoder constraint specified in the reverse mask when the one or more criteria are satisfied.

28. The method of claim 23, wherein the performing the uplink transmission in accordance with the reverse mask further comprises sending data carried by the uplink transmission to both the serving AP and the neighboring AP in accordance with a multipoint reception technique.

29. The method of claim 23, wherein the one or more criteria are satisfied when at least one of following is satisfied:
   an available backhaul link capacity of the serving AP is below a threshold;
   the served UE is required to use a high transmit power to communicate with the serving AP; or
   the served UE needs to transmit data having a quality of service (QoS) parameter that is not satisfied by a link between the serving AP and a serving UE.

30. A served user equipment (UE) comprising:
   a processor; and
   a non-transitory computer readable storage medium storing programming for execution by the processor, the programming including instructions to:
   receive a reverse mask from a first controller associated with a neighboring access point (AP) that does not serve the served UE, the reverse mask specifying both a maximum modulation coding scheme (MCS) level and a minimum transmit power level for an uplink transmission from the served UE, the maximum MCS level and the minimum transmit power level configured such that the uplink transmission from the served UE to a serving AP has a successful decoding probability at the neighboring AP that exceeds a threshold, the maximum MCS level and the minimum transmit power level determined by the first controller based on channel state information (CSI) generated by the neighboring AP; and
   perform the uplink transmission to the serving AP in accordance with the maximum MCS level and the minimum transmit power level specified in the reverse mask when one or more criteria are satisfied.

31. The served UE of claim 30, wherein uplink transmission signals from the served UE to the serving AP interfere with, or are projected to interfere with, wireless signals communicated to the neighboring AP.

32. The served UE of claim 30, wherein the minimum transmit power level specified by the reverse mask is adapted to produce a received signal power of the uplink transmission at the neighboring AP exceeds a threshold.

33. The served UE of claim 30, wherein the reverse mask further specifies a precoder constraint for the uplink transmission of the served UE that is configured to produce constructive interference at a spatial location of the neighboring AP such that a received signal power of the uplink transmission at the neighboring AP exceeds a threshold, and wherein the uplink transmission to the serving AP is performed in accordance with the maximum MCS level, the minimum transmit power level and the precoder constraint specified in the reverse mask when the one or more criteria are satisfied.

34. The served UE of claim 30, wherein the instructions to perform the uplink transmission in accordance with the maximum MCS level and the minimum transmit power level in the reverse mask further comprise sending data carried by the uplink transmission to both the serving AP and the neighboring AP in accordance with a multipoint reception technique.

* * * * *